(12) United States Patent
Wahl

(10) Patent No.: US 6,923,145 B2
(45) Date of Patent: Aug. 2, 2005

(54) FLUME FLUSH FLOOR FOR LIVESTOCK

(76) Inventor: Michael Wahl, N6314 County F., Monticello, WI (US) 53570

( * ) Notice: Subject to any disclaimer, the term of this patent is extended or adjusted under 35 U.S.C. 154(b) by 0 days.

(21) Appl. No.: 10/393,137

(22) Filed: Mar. 20, 2003

(65) Prior Publication Data
US 2004/0194726 A1 Oct. 7, 2004

(51) Int. Cl.⁷ .................................................. A01K 1/01
(52) U.S. Cl. ....................................................... 119/530
(58) Field of Search ................................ 119/530, 529, 119/527, 458, 479; D30/120; 52/414, 576, 601, 602

(56) References Cited

U.S. PATENT DOCUMENTS

| | | | | |
|---|---|---|---|---|
| 169,481 A | * | 11/1875 | Rochevot et al. | 62/529 |
| 469,044 A | * | 2/1892 | Jungbluth | 119/450 |
| 495,203 A | * | 4/1893 | Ludwig | 119/527 |
| 502,004 A | * | 7/1893 | Logan | 119/527 |
| 559,035 A | * | 4/1896 | Logan | 119/527 |
| 1,890,980 A | * | 12/1932 | Ferris et al. | 119/527 |
| 3,457,901 A | * | 7/1969 | Abraham | 119/528 |
| 3,604,174 A | * | 9/1971 | Nelson, Jr. | 52/601 |
| 3,626,904 A | * | 12/1971 | Hatten | 119/530 |
| 3,848,568 A | * | 11/1974 | Hazen et al. | 119/527 |
| 4,041,669 A | * | 8/1977 | Rauenhorst | 52/576 |
| 4,258,662 A | * | 3/1981 | Schafer | 119/528 |
| D259,287 S | * | 5/1981 | Bunger | D30/120 |
| D259,291 S | * | 5/1981 | Bunger | D30/120 |
| D259,366 S | * | 5/1981 | Bunger | D30/120 |
| 4,325,326 A | * | 4/1982 | Schierenbeck | 119/530 |
| D265,257 S | * | 6/1982 | Bunger et al. | D30/120 |
| 4,348,344 A | * | 9/1982 | Nobbe | 264/31 |
| D269,130 S | * | 5/1983 | Bunger | D30/120 |
| D269,384 S | * | 6/1983 | Bunger | D30/120 |
| D269,385 S | * | 6/1983 | Bunger | D30/120 |
| 4,387,666 A | * | 6/1983 | Thye-Lokenberg | 119/530 |
| 4,520,759 A | * | 6/1985 | Deters | 119/447 |
| D322,907 S | * | 1/1992 | Raburn | D6/596 |
| D349,774 S | * | 8/1994 | Kongsgaard | D25/156 |
| 5,687,534 A | * | 11/1997 | Kongsgaard et al. | 52/664 |
| 6,729,094 B1 | * | 5/2004 | Spencer et al. | 52/414 |

FOREIGN PATENT DOCUMENTS

GB 2248076 A * 3/1992 ........... A01K/1/015

* cited by examiner

Primary Examiner—Yvonne R. Abbott
(74) Attorney, Agent, or Firm—Emrich & Dithmar LLC

(57) ABSTRACT

A floor arrangement for use with livestock such as in a barn is in the form of a concrete panel and includes plural spaced, elongated, linear flumes, or channels, disposed within the panel and extending its length. Each flume is generally cylindrical in shape and opens to the upper surface of the panel via a narrow slot in the upper surface. Animal waste enters the flume via its upper slot and is carried away by flowing water introduced at a first end of the flume and discharged at a second, opposed end. The panel's upper surface is notched to provide safe, stable footing for the animals, with the notches terminating in a slot to facilitate discharge of animal waste into the spaced flumes. The floor is comprised of plural connected panels, with the flumes of adjacent floor panels aligned to provide continuous flow channels extending the entire floor.

18 Claims, 3 Drawing Sheets

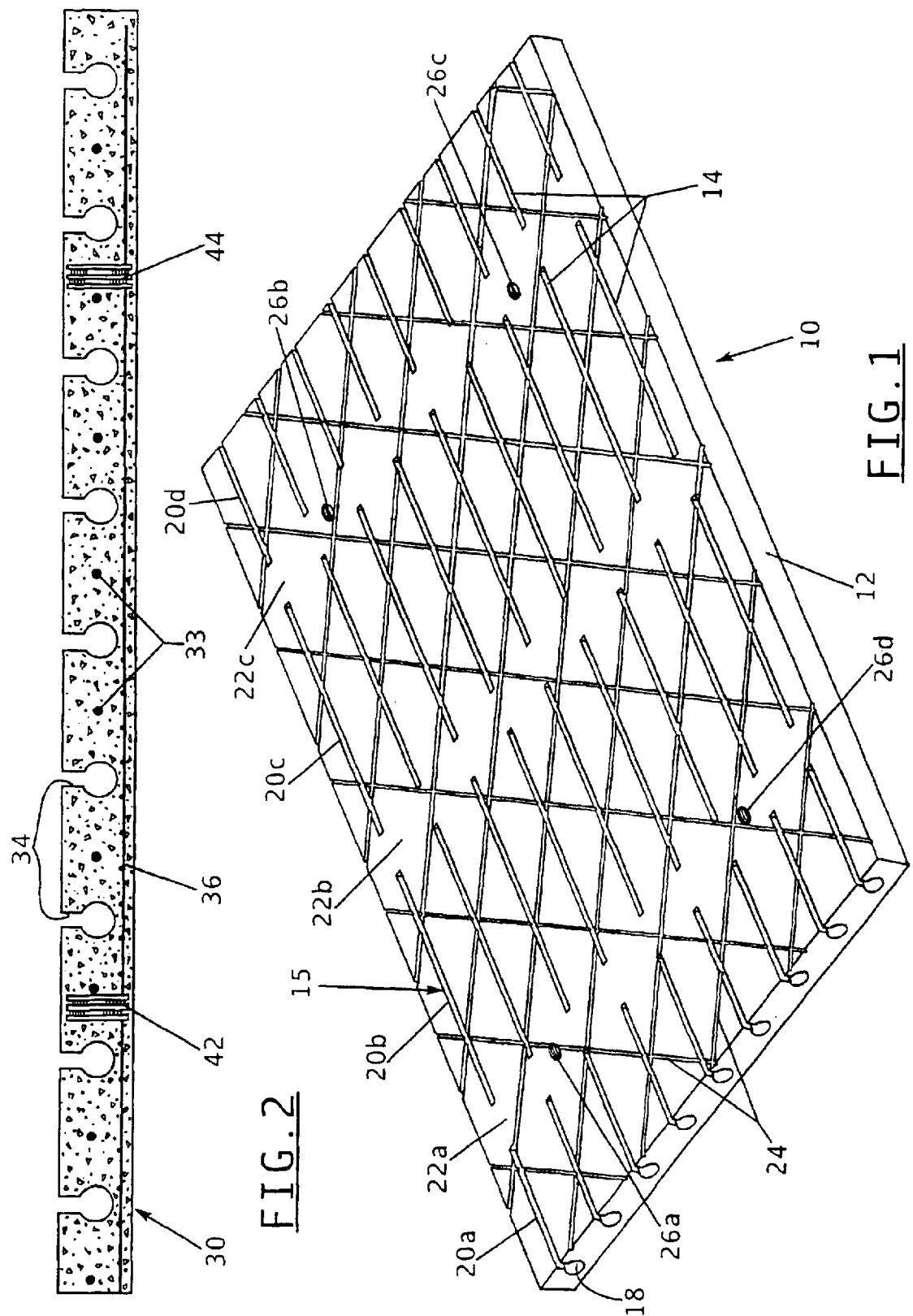

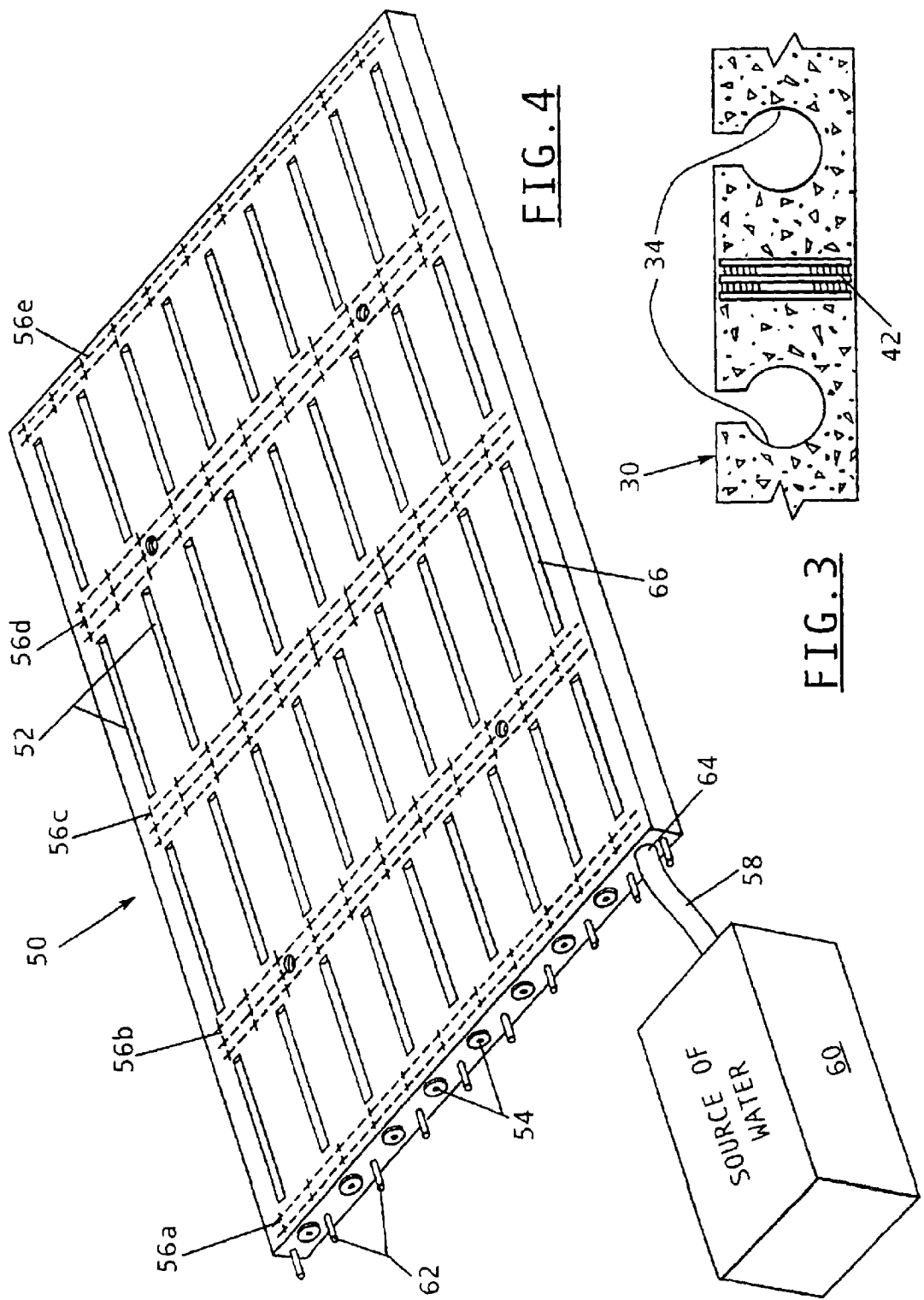

FLUME FLUSH FLOOR FOR LIVESTOCK

FIELD OF THE INVENTION

This invention relates generally to a floor for use in an area or structure used by livestock, and is particularly directed to a concrete floor such as for use in a barn containing livestock which provides safe footing for the animals and facilitates removal and discharge of animal waste.

BACKGROUND OF THE INVENTION

A floor used in an agricultural building containing livestock is typically comprised of poured concrete. The upper surface of the concrete floor is typically provided with parallel, spaced grooves for animal foot traction. The animal waste is typically discharged into a pit, known as a digester, with methane given off by the waste used for generating electricity on the farm. Solid residue recovered may be used as a fertilizer or as mulch. The animal waste must be provided to the digester while the methane is still in a useable form, or typically within eight (8) hours of discharge. The concrete floor slopes to facilitate removal of the animal waste. A hand tool is typically applied to the concrete's upper surface to incorporate the aforementioned grooves therein before the concrete sets. Even with these grooves, the concrete floor must be frequently swept, washed down or otherwise cleared of debris to prevent accumulation of animal waste.

This approach is not without its problems. For example, dairy livestock, i.e., cows, are characteristically quite awkward and frequently slip and fall down, causing injury to the animal. If the injury is serious, the cow may have to be destroyed. Even a minor injury requires that additional care be taken of the injured cow by the farmer, with the injured cow's milk production typically reduced as a result of the injury. In addition, the floor's surface grooves frequently become obstructed with solid waste preventing waste removal. This condition does not promote the health of the animals, and makes the floor itself more hazardous and likely to cause injury to the animals.

The present invention overcomes the aforementioned limitations of prior art floors such as used in a barn for livestock by facilitating the removal of animal waste from the floor using a unique flushing system while providing a high strength support surface which affords stable footing and promotes the health and safety of the animals.

OBJECTS AND SUMMARY OF THE INVENTION

Accordingly, it is an object of the present invention to provide a clean, safe flooring arrangement for use with livestock such as in a barn.

It is another object of the present invention to provide a flooring arrangement for use with livestock which facilitates the removal of animal waste and provides safe, stable footing for the animals.

Yet another object of the present invention is to provide a floor which is particularly adapted for use with livestock, of high strength, easily fabricated and assembled, safe for the animals, and promotes sanitary conditions.

The present invention contemplates a floor arrangement for use with livestock comprising: a poured concrete panel; a textured upper surface on said concrete panel for providing firm footing for the livestock; and plural flumes disposed within an upper surface of said concrete panel and extending between opposed first and second ends of said concrete panel, wherein the flumes are disposed in a spaced manner between opposed lateral edges of the concrete panel and allow for removal of animal waste from the upper surface of the concrete panel.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 1 is an upper perspective view of a flume floor panel in accordance with the principles of the present invention;

FIG. 2 is a sectional view of a flume floor panel in accordance with the present invention;

FIG. 3 is a partial sectional view showing additional details of the inventive flume floor panel;

FIG. 4 is an upper perspective view shown partially in phantom of another embodiment of a flume floor panel in accordance with the present invention;

DETAILED DESCRIPTION OF THE PREFERRED EMBODIMENTS

Figure 5:
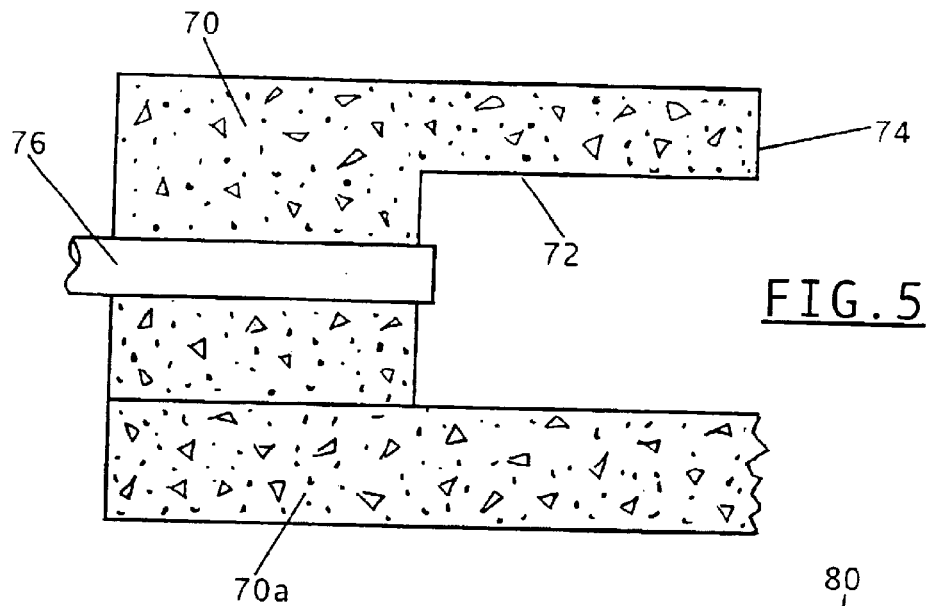
FIG. 5 is a partial sectional view of an end portion of the inventive flume floor panel showing details of the manner in which a water supply may be coupled to the panel for flushing animal waste from the panel.

Referring to FIG. 1, there is shown an upper perspective view of a flume floor panel 10 in accordance with the principles in the present invention. The flume floor panel 10 is preferably comprised of cast concrete which in one embodiment is 20 feet in length, 12 feet in width, and is on the order of 8½ inches. The inventive flume floor panel 10 is, of course, not limited to these specific dimensions, as these dimensions are provided only by way of example of one embodiment of the present invention.

Disposed on the upper surface of the flume floor panel 10 is a criss-cross pattern of elongated surface grooves, or notches, 24. The surface grooves 24 are formed in the flume floor panel 10 by providing a form within which the concrete is poured with a matching set of linear, upraised elements for engaging and forming these surface grooves 24 in the upper surface of the panel. This concrete form and the manner in which the flume floor panel 10 is formed are described in detail below. The surface grooves 24 provide the panel's upper surface with a rough texture so as to increase the frictional engagement of the panel's upper surface with the hooves of an animal standing on the flume floor panel 10. In this manner, the animals are provided with firm footing on the flume floor panel 10, even when wet, for substantially reducing the susceptibility of the animals to slipping on the panel and falling, resulting in injury. The pattern of the surface grooves 24 preferably covers the entire upper surface of the flume floor panel 10, with the individual grooves preferably being on the order of ¾" deep.

Disposed within the flume floor panel 10 and extending the length thereof are plural spaced, linear flumes, or channels, 14. Flumes 14 are arranged in a spaced manner across the width of the flume floor panel 10 and extend its length. Each of the flumes includes plural spaced upper slots 20a–20d and a lower cylindrical channel 18 as shown for the uppermost flume 15 in FIG. 1. The lower cylindrical channel 18 of flume 15 extends in a continuous manner from one end of the panel to its other end. The flume's upper slots 20a–20d are continuous with its lower cylindrical channel 18 and allow animal waste deposited on the upper surface of the flume floor panel 10 to flow into the lower cylindrical channels of the flume 15. A similar arrangement is provided for the other flumes within the flume floor panel 10. In a preferred embodiment, each of the upper slots is 1½" in width and the cylindrical channels are 4½" in diameter. Each of the flumes preferably slopes within the flume floor panel 10 allowing fluid within the flumes to flow under gravity from a first end of the panel to a second, opposed end of the panel. Similarly, each of the surface grooves 24 is sloped downwardly toward an adjacent slot within a flume to facilitate flow of fluids on the surface of the flume floor panel 10 into the spaced flumes disposed within the panel. Also disposed within the flume floor panel 10 are four threaded lift brackets 26a–26d which facilitate lifting and moving the panel after it is poured. The threaded lift brackets 26a–26d are described in detail below.

Referring to FIG. 2, there is shown a sectional view of another flume floor panel 30 in accordance with the present invention. Flume floor panel 30 also includes plural spaced flumes 34 disposed on its upper surface. Disposed within the flume floor panel 30 adjacent its lower surface is a wire mesh 36 which extends substantially the entire length and width of the panel. Wire mesh 36 is comprised of a high strength metal such as steel for reinforcing the flume floor panel 30. Also disposed within the flume floor panel 30 and extending the length thereof are plural spaced prestressed steel cables 33 for further increasing the strength of the panel. The prestressed steel cables 33 and the wire mesh 36 are positioned within the form used in fabricating the flume floor panel 30 prior to the concrete pouring operation. Also disposed within the flume floor panel 30 are the aforementioned plural threaded lift brackets, where only two of the lift brackets are shown as elements 42 and 44 in the sectional view of FIG. 2 for simplicity. There are preferably four threaded lift brackets within the flume floor panel 30, as previously described with respect to the flume floor panel 10 shown in FIG. 1.

A partial sectional view of the flume floor panel 30 is shown in FIG. 3 to illustrate additional details of the threaded lift brackets, where the first threaded lift bracket 42 is shown disposed between adjacent flumes 34 within the flume floor panel 30. Threaded lift bracket 42 extends between the upper and lower surfaces of the flume floor panel 30 and includes upper and lower threaded portions for receiving one or two threaded coupling pins, such as bolts (which are not shown in the figure for simplicity). By inserting one or two bolts in each of the threaded lift brackets, the flume floor panel 30 may be easily lifted by a hoist mechanism (also not shown) using cables attached to the threaded lift brackets. This facilitates moving the flume floor panel after fabrication such as for transport and installation.

Referring to FIG. 4, there is shown partially in phantom an upper perspective view of a flume floor panel 50 showing additional details of the invention. As in the previously described embodiments, the flume floor panel 50 includes plural spaced flumes 52 extending the length of the panel and positioned within the upper surface of the panel. The surface grooves have been omitted from the upper surface of the flume floor panel 50 shown in FIG. 4 so that other features of the panel can more clearly be illustrated, it being understood that these grooves are also preferably incorporated in the panel shown in FIG. 4. Also disposed within the panel are plural mesh reinforcing strips 56a–56e arranged in a spaced manner along the length of the panel and extending substantially its entire width. Each of the mesh reinforcing strips 56a–56e is preferably comprised of a high strength steel and is disposed adjacent the upper surface of the panel in those locations where the upper slots of the flumes are not present.

Disposed on opposed edges of the flume floor panel 30 are plural spaced dowels 62 which are also preferably comprised of a high strength metal such as steel. Each of the dowels 52 is disposed within a respective slot in an edge of the flume floor panel 30 and is adapted for insertion in a corresponding slot in an adjacent panel arranged in abutting contact with flume floor panel 30. The plural dowels 62 secure and couple adjacent ends of flume floor panels and maintain them in alignment. Also disposed within the ends of the flume floor panel 30 are plural spaced water couplings 54. Each of the water couplings 54 extends beyond the edge of the flume floor panel 30 and is continuous with a respective flume within the panel. The water couplings 54 allow a source of water to be connected to each of the flumes within the panel as shown for the case of flume 66 disposed adjacent the right hand edge of the flume floor panel 30 as shown in FIG. 4. Flume 66 is coupled to a source of water 60 by means of the combination of a water coupling 64 and a water conduit 58. The source of water 60 is shown coupled to only one flume 66 for simplicity, it being understood that the source of water would similarly be coupled to the remaining flumes disposed within the flume floor panel 30. By connecting a source of water 60 under pressure to each of the flumes at one end of the panel, animal waste deposited within the flumes may be flushed from the panel and discharged from its opposite end such as into a digester for decomposition as well as the generation of electricity.

Referring to FIG. 5, there is shown a simplified sectional view of an end portion of a flume floor panel 70 and the manner in which a water coupling 76 extends into and is connected to the panel's flume 72. Water coupling 76 extends from an outer edge of the panel into its flume 72. It is formed by positioning the water coupling 76 within the form in which the panel is formed prior to the pouring of concrete. Water conduit 76 is disposed between an upper surface of the flume floor panel and its lower base portion 70a. The upper portion of the flume floor panel 70 as shown in the sectional view of FIG. 5 includes an inner edge 74 defining an end of the upper slot portion of the flume 72 shown in the figure.

Figures 6, 7:
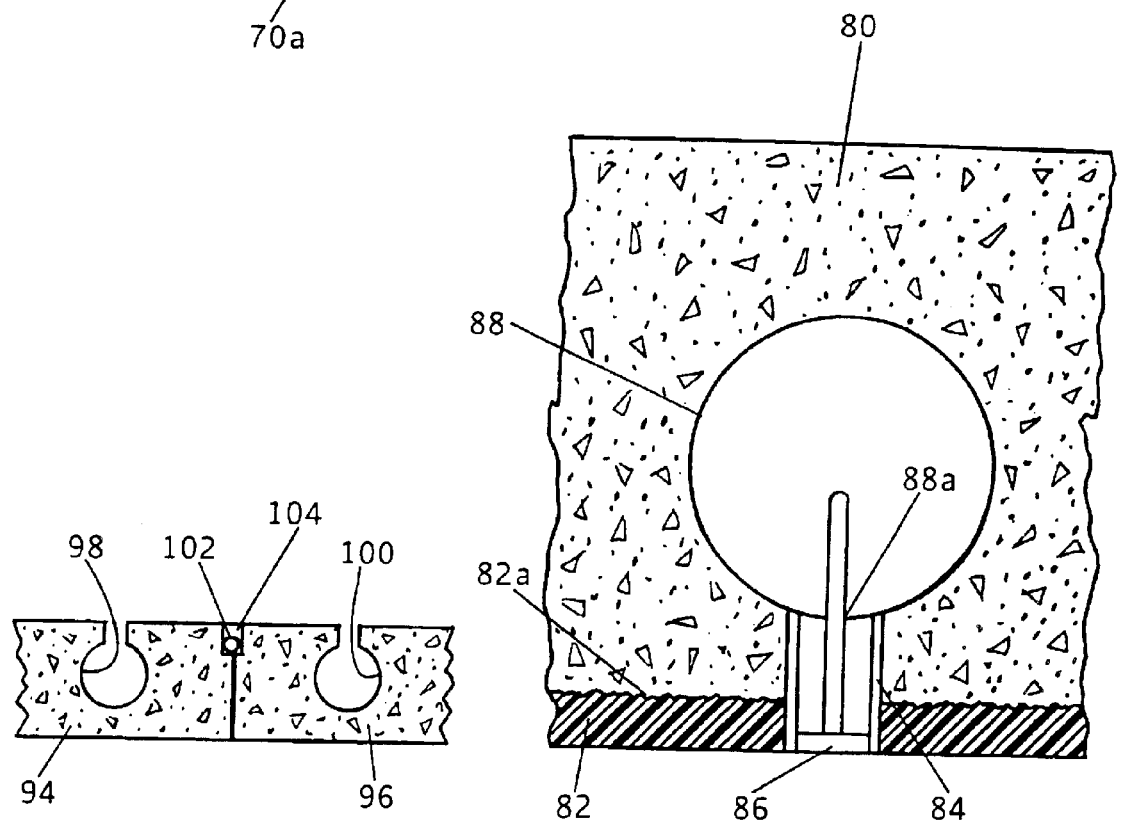
FIG. 6 is a partial sectional view of an arrangement for forming the flumes in the inventive flume floor panel in accordance with another aspect of the present invention.
FIG. 7 is a partial end-on view of a pair of flume floor panels showing the manner in which adjacent floor panels are positioned in edge-abutting contact in a sealed manner.

Referring to FIG. 6, there is shown a simplified sectional view of an arrangement for forming a flume within a flume floor panel in accordance with another aspect of the present invention. A lower portion of the form 80 used in forming a flume floor panel in accordance with the present invention includes a plastic bottom portion 82 having a textured upper surface 82a. Prior to pouring the concrete into the form 80, an elongated, linear slot insert 84 is positioned within a lower portion of the form 80 and within an aperture in the form's plastic bottom portion 82. The elongated slot insert 84 is used for forming a linear slot within the upper surface of the flume floor panel. Disposed within the elongated slot insert 84 is a T-insert 86 which is maintained in a generally vertical orientation as shown in the figure by the elongated slot insert. The upper portion of the T-insert 86 is positioned within a narrow slot 88a extending the length of a polyvinyl chloride (PVC) pipe 88 which is disposed on the elongated slot insert 84. The combination of the elongated slot insert 84 and T-insert 86 maintains the PVC pipe 88 securely in position within the form 80 during the pouring of concrete. After the concrete is poured and cures, the form 80 is turned over and the plastic bottom portion 82 of the form is removed from the upper surface of the thus-formed flume floor panel and the combination of the elongated slot insert 84 and T-insert 86 is removed from the upper surface of the flume floor panel. The elongated, linear PVC pipe 88 is then withdrawn from an end of the panel in a sliding manner. The panel is thus formed with plural flumes each having an upper slot in the upper surface of the panel and a lower cylindrical channel continuous with the slot as previously described.

Referring to FIG. 7, there is shown a simplified end-on view of a pair of flume floor panels 94 and 96 arranged in an abutting manner along their lateral edges in accordance with another aspect of the present invention. Flume floor panel 94 includes plural flumes such as flume 98. Similarly, flume 96 includes plural flumes including flume 100. Upper lateral edges of each of the flume floor panels 94 and 96 include a notched-out portion allowing for the insertion of a backer rod 102 between the panels when placed in edge-abutting contact as shown in FIG. 7. Backer rod 102 maintains the two flume floor panels in common alignment along their abutting lateral edges. A joint sealant 104 is deposited within the notched-out portions above the backer rod 102 to prevent fluids and other materials from entering the space between panels 94 and 96 and for preventing these materials from contacting the backer rod 102.

While particular embodiments of the present invention have been shown and described, it will be obvious to those skilled in the relevant art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A floor arrangement for use with livestock comprising:
a poured concrete panel;
a textured upper surface on said concrete panel for providing firm footing for the livestock; and
plural flumes formed entirely within said concrete panel and disposed within an upper surface of said concrete panel and extending between opposed first and second ends of said concrete panel, wherein said flumes are disposed in a spaced manner between opposed lateral edges of said concrete panel and allow for removal of animal waste from the upper surface of said concrete panel, wherein said textured upper surface of said concrete panel includes linear, elongated grooves arranged in an intersecting pattern, and wherein each of said grooves terminates on first and second opposed ends at respective flumes to facilitate discharge of animal waste into said flumes.

2. The floor arrangement of claim 1 wherein each of said flumes includes an upper elongated, linear slot within the panel's upper surface and a lower channel coupled to and continuous with said slot and disposed within said concrete panel.

3. The floor arrangement of claim 1 wherein each of said grooves slopes downwardly in a direction of a flume at which said groove terminates.

4. The floor arrangement of claim 1 wherein each of said flumes includes one or more aligned, linear upper slots disposed in the concrete panel's upper surface and a lower channel portion disposed within said concrete panel and continuous with said one or more upper slots.

5. The floor arrangement of claim 4 wherein each of said upper slots and lower channels has a width W1 and W2, respectively, where W2>W1.

6. The floor arrangement of claim 5 wherein each of said lower channels is generally cylindrical in shape.

7. The floor arrangement of claim 6 wherein each of said lower channels slopes downwardly in proceeding from a first end to a second opposed end of said concrete panel to facilitate water flow through said concrete panel.

8. The floor arrangement of claim 1 further comprising a source of water under pressure coupled to a first end of each of said flumes.

9. The floor arrangement of claim 8 further comprising plural water conduits each coupling a respective flume to said source of water under pressure.

10. The floor arrangement of claim 1 further comprising a high-strength wire mesh disposed in said concrete panel for increasing its strength.

11. The floor arrangement of claim 10 wherein said wire mesh is comprised of steel and extends substantially the entire length and width of said concrete panel.

12. The floor arrangement of claim 1 including first and second poured concrete panels each including said textured upper surface and first and second plural flumes, respectively, wherein said first and second concrete panels are arranged in edge-abutting contact, and wherein each of said first flumes is aligned and continuous with a respective one of said second flumes.

13. The floor arrangement of claim 12 further comprising plural connecting pins inserted into abutting edges of said first and second concrete panels for coupling and maintaining said concrete panels in alignment.

14. The floor arrangement of claim 1 further comprising plural spaced reinforcing cables disposed within said concrete panel and extending the length thereof.

15. A floor arrangement for use with livestock comprising:
a poured concrete panel;
a textured upper surface on said concrete panel for providing firm footing for the livestock; and
plural flumes disposed within an upper surface of said concrete panel and extending between opposed first and second ends of said concrete panel, wherein said flumes are disposed in a spaced manner between opposed lateral edges of said concrete panel and allow for removal of animal waste from the upper surface of said concrete panel, wherein each of said flumes includes plural upper, elongated, linear slots in common alignment in the concrete panel's upper surface and a lower channel coupled to and continuous with said plural slots and disposed within said concrete panel.

16. A floor arrangement for use with livestock comprising:
a poured concrete panel;

a textured upper surface on said concrete panel for providing firm footing for the livestock; and plural flumes formed entirely within said concrete panel and disposed within an upper surface of said concrete panel and extending between opposed first and second ends of said concrete panel, wherein said flumes are disposed in a spaced manner between opposed lateral edges of said concrete panel and allow for removal of animal waste from the upper surface of said concrete panel;

a high-strength wire mesh disposed in said concrete panel for increasing its strength; and plural reinforcing strips disposed in a spaced manner along the length of said concrete panel and extending the width of said concrete panel.

17. The floor arrangement of claim 16 wherein said wire mesh is disposed adjacent a lower surface of said concrete panel and said reinforcing strips are disposed adjacent an upper surface of said concrete panel.

18. The floor arrangement of claim 17 wherein said reinforcing strips are comprised of steel mesh.

* * * * *